Patented Feb. 13, 1934

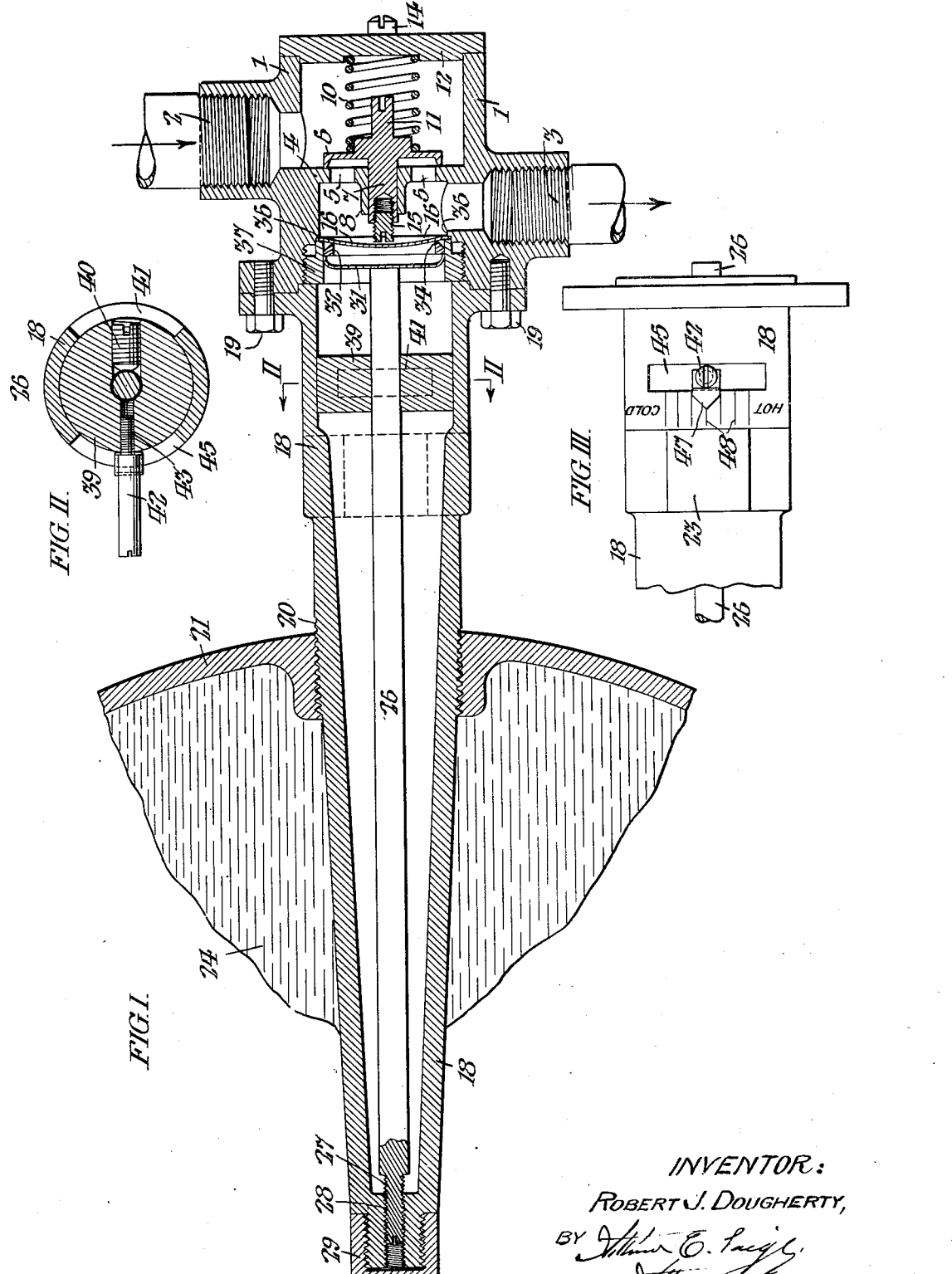

1,947,431

UNITED STATES PATENT OFFICE 1,947,431

THERMOSTATICALLY OPERATIVE VALVE

Robert J. Dougherty, Ambler, Pa., assignor to John Wood Manufacturing Company, Conshohocken, Pa., a corporation of Pennsylvania Application October 12, 1931. Serial No. 568,325

5 Claims. (Cl. 236—48)

My invention is applicable to control the flow of gas to a burner which is part of a water heater, by location of the thermostatic element in the body of water which is being heated. That thermostatic couple comprises a tube of copper, or other metal having a high coefficient of expansion, and containing a rod of another material having a coefficient of expansion which is substantially zero throughout the range of temperatures to which the couple is subjected. My invention includes means, accessible from the exterior of the valve casing, for adjustably varying the effective length of such inner member of said couple, and means interposed between said thermostatic couple and the valve, adapted to multiply the relative movement of said couple and effect snap action of the valve.

In the form of my invention hereinafter described; one member of the thermostatic couple is a cast metal casing which may be permanently rigidly connected with the wall of a water container and the other member of the thermostatic couple is adjustably screw threaded in engagement with said casing at the end of the latter projecting into the water container; so that the temperature at which snap action of the valve is effected may be varied by rotation of the inner member of the couple to shift its axial position with reference to the outer member of the couple. In that form; the valve mechanism is inclosed in a casing which is normally rigidly connected with said casing member of the couple, at the outer end thereof, but is readily detachable therefrom for repair and replacement of parts of the valve mechanism.

My invention includes the various novel features of construction and arrangement hereinafter more definitely specified.

In said drawing; Fig I is a plan sectional view, taken on the diameter of the valve and the thermostatic casing operatively connected therewith, with said casing in engagement with a water container.

Fig. II is a transverse sectional view taken on the line II, II, in Fig. I in the direction of the arrows marked thereon.

Fig. III is a fragmentary plan view of the outer end of the thermostatic casing shown in Fig. I, showing the means for making and indicating the relative axial adjustment of the inner member of the couple.

In said figures; the valve casing 1 is conveniently formed of cast metal with the gas inlet 2 and outlet 3 upon opposite sides of the partition 4. Said partition 4 has valve ports 5 through it controlled by the valve 6 having the inner stem 7 mounted to reciprocate in the bearing 8 in said partition. Said valve is continually pressed toward its seat by the spring 10 which bears at its inner end upon said valve 6 encircling the outer valve stem 11. Said spring abuts at its outer end against the closure cap 12 which is detachably engaged with said casing 1 by two screws 14. Said valve stem 7 carries the screw 15 at its inner end in axial adjustment therewith and both said screw and the outer valve stem 11 are slotted to facilitate axial adjustment of said screw in cooperative relation with the resilient disk 16 by which said valve is snapped open in opposition to the pressure of said spring 10, as hereinafter described.

Said valve casing 1 is rigidly but detachably connected with the thermostatic casing 18, conveniently by the tap bolts 19. Said casing 18 has the screw thread 20 conveniently of a tapered standard pipe size, for engagement thereof with the water container comprising the cylindrical shell 21. Engagement of said casing 18 with said shell 21 is conveniently effected by means of the hexagonal wrench hold 23 on said casing 18. The portion of said casing 18 projecting into the body of water 24 in said container 21 is preferably conical, as shown, not only to minimize the quantity of metal required to form it but to facilitate the circulation of water longitudinally with respect thereto as the result of upward flow of the water due to convection currents therein. The fact that said casing 18 converges toward the center of the container 21 induces the flow of water in that direction along the lower side of said casing 18.

Said casing 18 constitutes one member of the thermostatic couple of which the other member is the cylindrical rod 26 preferably formed of an alloy of ferric metal of such composition that it remains of substantially invariable length throughout the range of temperatures to which the couple is subjected. Said thermostatic rod 26 has the screw thread 27 at its inner end in engagement with the screw thread 28 in said casing 18 so that the relative axial position of said rod 26 may be adjustably varied by turning it. Leakage of water into the casing 18 from the container 21 is prevented by the screw cap 29 which is tightly fitted upon the end of said casing 18 before the latter is inserted in the container 21. The opposite end of said thermostatic rod 26 bears against the thrust disk 31 which bears against the thrust ring 32 which has the knife edge 34 bearing against the resilient disk 16. Said disk 16 is made of the concavo-convex form shown and is fulcrumed at its perimeter upon the fulcrum ledge 36 in said valve casing 1, upon which it is tightly held by the clamp ring 37 which is in screw threaded engagement with said casing 1 and which is prevented from accidental loosening by contact with the outer end of said casing 18, as shown in Fig. I.

Said thermostatic rod 26 is axially adjusted in the described screw threaded connection with the thermostatic casing 18 so that the disk 16 is continually under stress which is nearly sufficient to cause it to snap to concavo-convex position to the right of said fulcrum ledge 36, in order to minimize the relative movement of the members 18 and 26 of the thermostatic couple required to effect such snap action of said disk 16. Such snap movement of the disk 16 is effected by contraction of the portion of the thermostatic casing 18 projecting into the body of water 24 when the temperature of the latter falls below that for which the thermostatic couple is adjusted; such contraction of the casing 18 thrusting the rod 26 to the right in Fig. I, so that the knife edge 34 thrusts said disk 16 to the right of its dead center of movement, so that the resilience of the metal thus distorted causes it to snap to the reversely curved position with the effect of pushing open the valve 6 against the pressure of the spring 10 and thus permitting gas to flow through the inlet 2, valve ports 5, and outlet 3 to the gas burner by which the water 24 is heated. When the heating effect of the burner has raised the temperature of the water 24 to the temperature for which the thermostat is set; the consequent expansion of the casing 18 withdraws the rod 26 to the left in Fig. I relieving the stress upon the disk 16 and permitting it to snap itself back to its original position shown, thus releasing the valve 6 and permitting the latter to be shut by the spring 10. The extent to which said valve is thus opened may be varied by axial adjustment of said screw 15. The precise temperature at which that snap action is effected may be varied, as above contemplated, by turning movement of said thermostatic rod 26 and such movement is conveniently effected by means of the collar 39 which is detachably but rigidly connected with said rod 26 by the set screw 40 extending through the sectoral slot 41 in the side of said casing 18. Said collar 39 has the radial operating handle 42 rigidly connected therewith, conveniently by the screw thread 43 shown in Fig. II. Said handle 42 projects through the sectoral slot 45 in the side of said casing 18 and holds the index pointer 47 in cooperative relation with the circular series of graduations 48 on the outer surface of said casing 18, as shown in Fig. III.

As shown in Fig. III, said index 47 is in the intermediate position with reference to the graduations 48, and, as indicated, movement of said handle 42 upward with reference to Fig. III sets the rod 26 to maintain the water colder than when said index is in the middle position, and movement of said rod downward with reference to Fig. III sets said rod in position to maintain the water hotter than when the index is in the position shown. In other words; turning said rod 26 clockwise with reference to Fig. II, by movement of said handle 42, shifts said rod 26 axially to the left with reference to Fig. I to lessen its effective length, and reverse movement of said rod increases its effective length with reference to the spring disk 16 and consequently varies the critical temperature at which said disk is snapped to open said valve 6 and permit the flow of gas to the burner to heat the water 24 to the temperature determined by the set position of the index pointer 47, say, from 140° to 170°.

Initial calibration of the relative position of the thermostatic elements 18 and 26 is facilitated and the maintenance of the adjustment thereof insured by the fact that said rod is in direct screw threaded engagement with the casing 18. Interposition of a bushing or other separate element between the thermostatic elements, as in the prior art, affords opportunity for accidental variation in the relation of the thermostatic elements by displacement of the intermediate element, unless means are employed, at additional cost, for securing said intermediate element against such accidental displacement. However, I do not desire to limit myself to the precise details of construction and arrangement herein set forth, as it is obvious that various modifications may be made therein without departing from the essential features of my invention, as defined in the appended claims.

I claim:

1. In a thermostatically operative valve structure, the combination with a casing having a fluid inlet and a fluid outlet with a valve port between them; of a valve for controlling said port; a spring stressing said valve to close said port; a thermostatic couple for opening said valve against the stress of said spring and including a rod of thermostatically invariable length mounted in said casing in coaxial relation with said valve and a tubular member on said casing of thermostatically variable length, in coaxial relation with said rod; a concavo-convex snap disk in said casing and having its center normally spaced away from said valve to permit the latter to be closed by its spring; an annular ledge in said casing forming a fulcrum for the perimeter of said snap disk in coaxial relation with said valve and rod; a clamp ring for holding the perimeter of said disk on said ledge; a thrust ring mounted to reciprocate in said clamp ring in coaxial relation with said valve, rod, and disk, and having an annular edge bearing against said snap disk in spaced relation with its perimeter; a thrust disk mounted to reciprocate in said clamp ring and interposed between said rod and thrust ring; and means for axially adjusting said rod in said casing to normally maintain said snap disk under stress of said thrust ring and thrust disk, nearly sufficient to snap it; whereby slight decrement of temperature of said thermostatic couple effects relative movement thereof to snap said disk and open said valve against the stress of its spring.

2. A structure as in claim 1, wherein the clamp ring is in screw threaded engagement with the casing and normally rigidly connected therewith to maintain the snap disk in proper relation with the valve.

3. In a thermostatically operative valve structure; the combination with a valve casing having a fluid inlet and a fluid outlet with a partition having a valve port between them; of a valve for controlling said port, having a stem mounted to reciprocate in said partition; a spring continually stressing said valve to close said port; an annular ledge in said casing forming a fulcrum; a concavo-convex snap disk having its perimeter seated on said fulcrum ledge and having its center normally spaced away from said valve to permit the latter to be closed by its spring; a clamp ring for holding the perimeter of said disk on said ledge;

a thermostatic couple for opening said valve against the stress of said spring including a tubular thermostatic casing secured to said valve casing in coaxial relation with said valve, and thermostatically variable in length, and a rod of thermostatically invariable length mounted in said thermostatic casing in coaxial relation with said valve; means axially adjustably connecting the end of said rod remote from said valve with the adjacent end of said thermostatic casing; means detachably rigidly connecting said valve casing with said thermostatic casing, whereby said clamp ring is normally held in clamping position; a thrust ring mounted to reciprocate in said clamp ring in coaxial relation with said valve, rod, and disk, and having an annular edge bearing against said snap disk in spaced relation with its perimeter; a thrust disk mounted to reciprocate in said clamp ring, interposed between said rod and thrust ring; whereby said snap disk is normally maintained under stress of said couple nearly sufficient to snap it, and slight decrement of temperature of said couple effects relative movement thereof to snap said disk and open said valve against the stress of its spring.

4. A structure as in claim 1, wherein the tubular member of the casing is conical and has means for supporting it in horizontal position in a water container; whereby flow of water axially with respect to said casing, by convection, is induced for subjecting said couple to average temperature of said water.

5. A structure as in claim 3, wherein the thermostatic casing has means for supporting it in an opening in the wall of a water container, and forms a water tight closure for said opening independently of said valve casing.

ROBERT J. DOUGHERTY.